US012227139B2

(12) United States Patent
Deng et al.

(10) Patent No.: US 12,227,139 B2
(45) Date of Patent: Feb. 18, 2025

(54) AIRBAG ASSEMBLY FOR LIFTGATE

(71) Applicant: Ford Global Technologies, LLC, Dearborn, MI (US)

(72) Inventors: Zhibing Deng, Northville, MI (US); Srinivas Reddy Malapati, Novi, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/324,218

(22) Filed: May 26, 2023

(65) Prior Publication Data
US 2024/0391410 A1 Nov. 28, 2024

(51) Int. Cl.
*B60R 21/20* (2011.01)
*B60J 5/10* (2006.01)
*B60R 21/231* (2011.01)
*B60R 21/2338* (2011.01)

(52) U.S. Cl.
CPC ............... *B60R 21/20* (2013.01); *B60J 5/101* (2013.01); *B60R 2021/23153* (2013.01); *B60R 2021/23386* (2013.01)

(58) Field of Classification Search
CPC .......... B60R 21/20; B60R 2021/23153; B60R 2021/23386; B60R 21/232; B60R 21/213; B60R 21/214; B60R 21/2338
See application file for complete search history.

(56) References Cited

U.S. PATENT DOCUMENTS

| 6,113,132 A | 9/2000 | Saslecov |
| 7,237,798 B2 | 7/2007 | Mori et al. |
| 7,290,798 B2 | 11/2007 | Mori et al. |
| 7,364,185 B2 * | 4/2008 | Mori ............... B60R 21/214 280/749 |
| 7,461,858 B2 * | 12/2008 | Hirata ............. B60R 21/2338 280/730.2 |
| 7,648,160 B2 * | 1/2010 | Mori ............... B60N 2/42745 280/730.1 |
| 7,878,530 B2 | 2/2011 | Mizuno et al. |
| 7,909,357 B2 | 3/2011 | Iida et al. |

(Continued)

FOREIGN PATENT DOCUMENTS

| DE | 102014213162 A1 | 1/2016 |
| JP | 2005041460 A | 2/2005 |

(Continued)

OTHER PUBLICATIONS

English translation of DE10214213162 (Year: 2024).*
Non-Final Office Action dated Dec. 21, 2023 re U.S. Appl. No. 18/180,895 filed Mar. 2023.

*Primary Examiner* — Paul N Dickson
*Assistant Examiner* — Tiffany L Webb
(74) *Attorney, Agent, or Firm* — Frank A. MacKenzie; Bejin Bieneman PLC

(57) ABSTRACT

A vehicle includes a vehicle roof and a liftgate pivotable relative to the vehicle roof between an open position and a closed position. The vehicle includes an airbag supported by the liftgate and moveable with the liftgate between the open position and the closed position. A tether is fixed to the airbag and the liftgate. The tether extends from the airbag vehicle-rearward to the liftgate.

18 Claims, 6 Drawing Sheets

(56) References Cited

U.S. PATENT DOCUMENTS

| | | | |
|---|---|---|---|
| 8,393,642 | B2 | 3/2013 | Nakaya et al. |
| 8,419,051 | B2 | 4/2013 | Kobayashi et al. |
| 9,321,423 | B2 | 4/2016 | Jaradi et al. |
| 9,428,138 | B2 | 8/2016 | Farooq et al. |
| 11,104,291 | B1 * | 8/2021 | Dennis ................. B60R 21/214 |
| 11,338,758 | B2 | 5/2022 | Park et al. |
| 11,529,927 | B2 | 12/2022 | Kwon |
| 2006/0055153 | A1 | 3/2006 | Hirata |
| 2009/0212537 | A1 | 8/2009 | Slaats et al. |
| 2022/0250573 | A1 | 8/2022 | Jayakar et al. |

FOREIGN PATENT DOCUMENTS

| | | |
|---|---|---|
| JP | 2006103660 A | 4/2006 |
| JP | 2009078770 A | 4/2009 |
| JP | 2006088714 A | 4/2010 |
| JP | 2006082731 A | 8/2010 |
| JP | 2011005912 A | 1/2011 |
| JP | 5151867 B2 | 2/2013 |
| JP | 2009241692 A | 2/2013 |
| JP | 201105943 A | 5/2014 |

* cited by examiner

AIRBAG ASSEMBLY FOR LIFTGATE

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in a passenger compartment of the vehicle. Vehicles may include airbags supported on a dash, side air curtains mounted to roof rails, seat-mounted airbag, etc.

DETAILED DESCRIPTION

Figure 1:
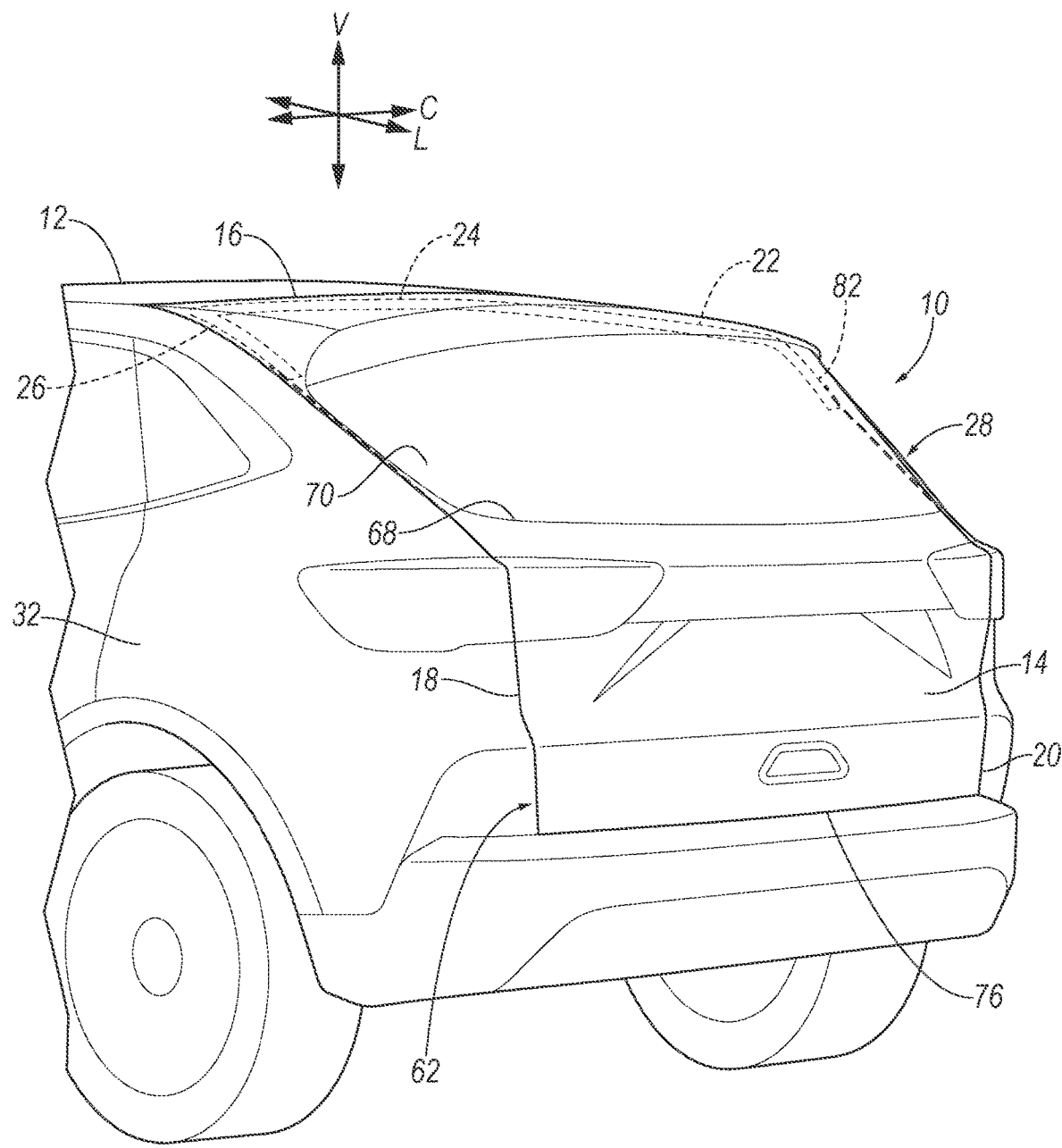
FIG. 1 is a perspective view of a rear of the vehicle with a liftgate in a closed position.

A vehicle includes a vehicle roof and a liftgate pivotable relative to the vehicle roof between an open position and a closed position. An airbag is supported by the liftgate and is moveable with the liftgate between the open position and the closed position. A tether is fixed to the airbag and the liftgate. The tether extends from the airbag vehicle-rearward to the liftgate.

The vehicle may include a seat including a seatback. The airbag in an inflated position is vehicle-forward of the seatback. The tether may be fixed to the airbag vehicle-rearward of the seat. The liftgate may be above the seat.

The airbag may have a first segment elongated cross-vehicle and a second segment extending vehicle-rearward from the first segment. The tether is fixed to the second segment. The vehicle may include a seat including a seatback, the seatback being vehicle-rearward of the first segment in an inflated position. The second segment may be above the seatback when the second segment is in the inflated position. The airbag may include a third segment spaced cross-vehicle from the second segment and extending vehicle-rearward from the first segment. A second tether may be fixed to the third segment and the liftgate. The second tether may extend from the airbag vehicle-rearward to the liftgate. The seat may be between the tether and the second tether. The first segment may have an inflation chamber, the second segment may have an inflation chamber open to the inflation chamber of the first segment, the third segment may have an inflation chamber open to the inflation chamber of the first segment, and the knee segment may have an inflation chamber open to the inflation chamber of the first segment. The seat may include a head restraint. The second segment may be adjacent the head restraint in the inflated position.

The vehicle may include a second tether fixed to the airbag and the liftgate. The second tether is spaced cross-vehicle from the tether and extending from the airbag vehicle-rearward to the liftgate.

The airbag may include a first segment supported by the liftgate and a knee segment supported by and extending downwardly from the first segment in an inflated position. The first segment may have a vehicle-forward face in the inflated position and the knee segment may extend vehicle-forward and downward from the first segment. The airbag may include an internal tether extending from the first segment to the knee segment. The airbag may have a second segment extending vehicle-rearward from the first segment and an internal tether extending from the second segment through the first segment to the knee segment.

The tether may be external to the airbag.

The vehicle may include an inflator supported by the liftgate.

A liftgate assembly may include a liftgate having a first end, a second end, a third end, and a fourth end. The first end is spaced from the fourth end and the second end and third end each extend from the first end to the fourth end. A hinge is on the first end of the liftgate. An airbag is supported by the liftgate and is moveable with the liftgate. A tether is fixed to the airbag and the liftgate. The tether extends from the airbag toward the fourth end of the liftgate.

The airbag may have a first segment elongated along the first end of the liftgate and a second segment extending from the first segment toward the third end of the liftgate. The tether may be fixed to the second segment of the airbag and may extend from the second segment toward the third end of the liftgate.

With reference to the Figures, wherein like numerals indicate like parts throughout the several views, a vehicle 10 includes a vehicle roof 12 and a liftgate 14 pivotable relative to the vehicle roof 12 between an open position and a closed position. The vehicle 10 includes an airbag 22 supported by the liftgate 14 and moveable with the liftgate 14 between the open position and the closed position. A tether 106 is fixed to the airbag 22 and the liftgate 14. The tether 106 extends from the airbag 22 vehicle-rearward to the liftgate 14.

In the event of certain impacts to the vehicle 10, the airbag 22 inflates from an uninflated position (FIGS. 2 and 4) to an inflated position (FIGS. 3 and 5) to control the kinematics of an occupant. The support of the airbag 22 by the liftgate 14 allows for packaging of the airbag 22 to inflate to control the kinematics of the occupant. The support of the airbag 22 on the liftgate 14 allows for inflation to control the kinematics of an occupant seated in a seat 46 and also can accommodate for packaging constraints in other areas of the vehicle 10, e.g., the vehicle roof 12, a rear pillar 34, etc.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc.

The vehicle 10 includes a vehicle body 28. The vehicle body 28 may be of a unibody construction, a body-on-frame construction, or any suitable construction. In the unibody construction, the vehicle body 28 serves as a frame, and the vehicle body 28 (includes the rockers, pillars 34, roof rails, etc.) is unitary, i.e., a continuous one-piece unit. As another example, in body-on-frame construction (also referred to as a cab-on-frame construction), the vehicle body 28 and frame are separate components, i.e., are modular, and the vehicle body 28 is supported on and affixed to the frame. In other examples, the vehicle body 28 may have any suitable construction. The vehicle body 28 may be of any suitable material, for example, steel, aluminum, etc.

The vehicle body 28 includes the vehicle roof 12, vehicle pillars 34, body panels, a vehicle floor 30, etc. The vehicle body 28 defines the passenger compartment 96 to house occupants, if any, of the vehicle 10. The passenger compartment 96 may extend across the vehicle 10. i.e., from one side to the other side of the vehicle 10. The passenger compartment 96 includes a front end and a rear end with the front end being in front of the rear end during forward movement of the vehicle 10.

With reference to FIG. 1, the vehicle 10 defines a vehicle-longitudinal axis L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V extending through a vehicle floor 30 and the vehicle roof 12. The vehicle-longitudinal axis L, the cross-vehicle axis C, and the vertical axis V are perpendicular relative to each other.

The vehicle roof 12 and the vehicle floor 30 are spaced from each other. Specifically, the vehicle floor 30 is spaced below the vehicle roof 12. The vehicle roof 12 defines the upper boundary of the passenger compartment 96 and may extend from the front end of the passenger compartment 96 to the rear end of the passenger compartment 96. The vehicle roof 12 may include roof rails and a roof panel extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle floor 30 defines the lower boundary of the passenger compartment 96 and may extend from the front end of the passenger compartment 96 to the rear end of the passenger compartment 96. The vehicle floor 30 may include upholstery, for example, carpet, and may have a class-A surface facing the passenger compartment 96, i.e., a surface specifically manufactured to have a high quality, finished, aesthetic appearance free of blemishes.

With reference to the Figures, the vehicle body 28 includes a body side 32. Specifically, the vehicle body 28 includes two body sides 32 spaced cross vehicle from each other. The body side 32 is a side of the body located vehicle-outboard of the passenger compartment 96. The body sides 32 may be spaced from each other along the cross-vehicle axis A on opposite sides of the longitudinal axis L and may be elongated along the longitudinal axis L. The body side 32 includes one or more door openings 60. The vehicle floor 30 extends from one body side 32 to the other body side 32 and the vehicle roof 12 extends from one body side 32 to the other body side 32. The body side 32 may include a rear-window opening adjacent a seatback 48 of a rear one of the seats 46.

The vehicle body 28, specifically each body side 32, may include pillars. In some examples, the pillars on the same body side 32 are separated by one of the door openings 60. For example, the vehicle body 28 may include a rear pillar 34 on each side of the vehicle 10. The rear pillar 34 may extend between the liftgate 14 and a rear door opening and other pillars may be vehicle-forward of the rear pillars 34, e.g., between adjacent doors. The vehicle 10 may include any suitable number of pillars on either body side 32. The pillars may extend from the vehicle roof 12 to the vehicle floor 30.

Figure 2:
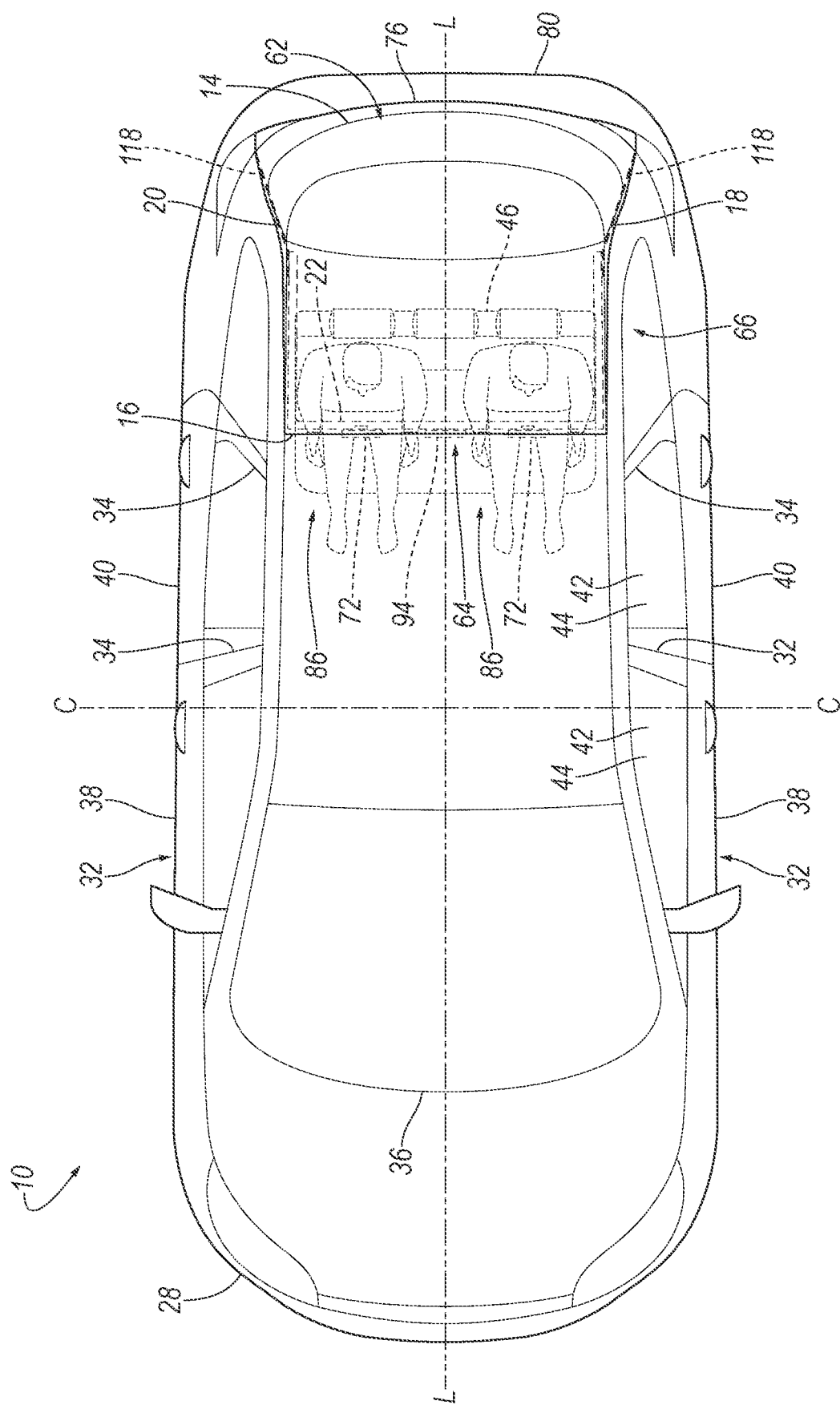
FIG. 2 is a top view of the vehicle with an airbag in an uninflated position.
Figure 3:
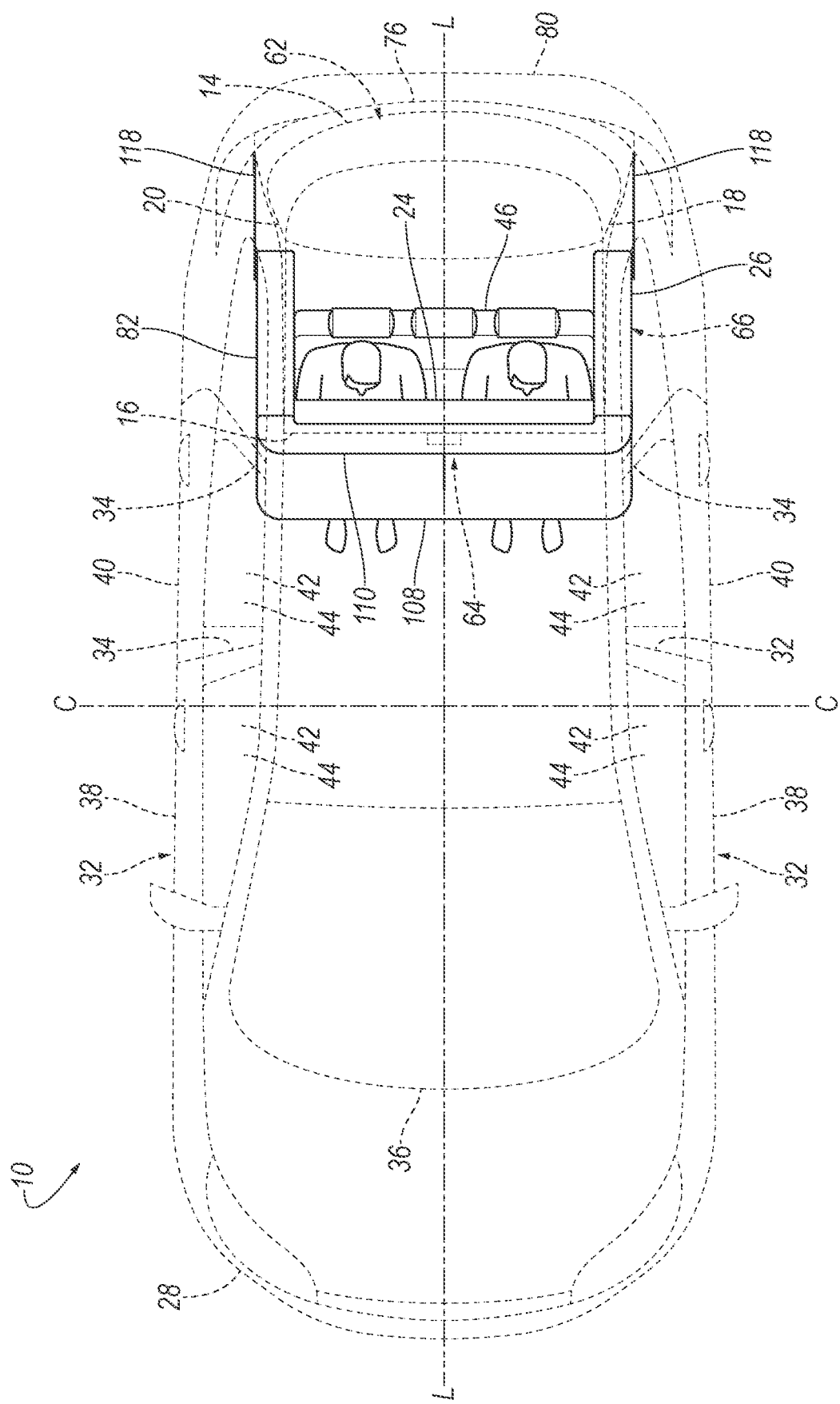
FIG. 3 is a top view of the vehicle with the airbag in an inflated position.

With reference to FIGS. 2 and 3, the vehicle 10 includes vehicle doors 38, 40 openable for occupants to enter and exit a passenger compartment 96. In the example shown in the Figures, the vehicle 10 includes a front door 38 and a rear door 40 on each body side 32. The front door 38 is vehicle-forward of the rear door 40 along the longitudinal axis L of the vehicle 10. Each door 38, 40 includes at least one door panel (not numbered) and the door-trim panel supported on the door panel. Specifically, the door 38, 40 may include two panels, namely a door inner (not numbered) and a door outer (not numbered). In such an example, the door-trim panel and the door outer are fixed to the door inner. The door-trim panel is positioned opposite the door outer. The door-trim panel is inboard relative to the door inner, and the door outer is outboard relative to the door inner. The door 38, 40 includes a window opening 42 that may be completely closed by a window 44 of the window 44 is in a fully raised position. The door outer faces outboard relative to the vehicle 10. The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.). The door inner may be metal (such as steel, aluminum, etc.) or polymeric (such as fiber reinforced plastic composite, etc.). The door inner provides structural rigidity for the door outer. The door inner may provide a mounting location for components of the door. The door-trim panel may include a covering. The covering may include upholstery, padding, etc. The upholstery may be cloth, leather, faux leather, or any other suitable material. The door-trim panel may be a material suitable for an interior of the vehicle 10, such as vinyl, plastic, leather, wood, etc.

With reference to FIGS. 2-5, the vehicle 10 may include one or more seats 46. Specifically, the vehicle 10 may include any suitable number of seats 46. The seats 46 are supported by the vehicle floor 30. The seats 46 may be arranged in any suitable arrangement in the passenger compartment 96. One or more of the seats 46 may be at the front end of the passenger compartment 96, e.g., a front row of seats. One or more of the seats 46 may be behind the front end of the passenger compartment 96, e.g., at the rear end of the passenger compartment 96 as a rear row of seats 46. In the example shown in the Figures, the vehicle 10 includes seats 46 is arranged as a rear row of seats 46. The rear row of seats 46 in the Figures may be, in some examples, a second row or a third row of seats 46. The seats 46 may be of any suitable type, e.g., a bucket seat 46, bench seat, etc.

Each of the seats 46 include a seatback 48 and a seat bottom 50. Each of the seats 46 may include a head restraint 52, as shown in the example in the Figures. The head restraint 52 may be supported by and extends upwardly from the seatback 48. The head restraint 52 may be stationary or selectively adjustable relative to the seatback 48 by an occupant. The seatback 48 may be supported by the seat bottom 50 and may be stationary relative to the seat bottom or reclinable relative to the seat bottom 50. The seatback 48 may extend from an upper end 54 to a lower end 56. The lower end 56 may be connected to the seat bottom 50. The upper end 54 of the seatback 48 may be spaced upwardly from the lower end 56 of the seatback 48, i.e., upwardly from the seat bottom 50. The head restraint 52 may extend upwardly from the upper end 54 of the seatback 48. The seatback 48, the seat bottom 50, and the head restraint 52 may be adjustable in multiple degrees of freedom. Specifically, the seatback 48, the seat bottom 50, and the head restraint 52 may themselves be adjustable. In other words, adjustable components within the seatback 48, the seat bottom 50, and the head restraint 52 may be adjustable relative to each other.

The seatback 48 may define at least one occupant-seating area 86. The occupant seating-area 86 is the space occupied by an occupant properly seated on the seat 46. The occupant-seating area 86 is vehicle-forward of the seatback 48 and above and vehicle-forward of the seat bottom 50. The portion of the occupant-seating area 86 that is vehicle-forward of the seat bottom 50 is the portion of the occupant-seating area 86 that is occupied by the knees of an occupant properly seated on the seat 46.

The body side 32 includes the door opening 60. The door opening 60 may be between pillars and between a sill 58 and the roof. In the example shown in the Figures, the body side 32 includes the front door opening and the rear door opening. The rear door opening is adjacent to the rear row of seats 46. The door opening 60 extends uninterrupted from one pillar to another pillar. The door opening 60 extends uninterrupted from the vehicle floor 30 to the vehicle roof 12. The door opening 60 allows for ingress and egress into the passenger compartment 96. The vehicle 10 may include any suitable number of door openings 60 to allow for ingress and egress into the passenger compartment 96. For example, the vehicle 10 may include one door opening 60 on each side of the vehicle 10. In other examples, the vehicle 10 may include multiple door openings 60 on each body side 32 of the vehicle 10.

The vehicle 10 includes at least one liftgate assembly 62. The liftgate assembly 62 includes the liftgate 14 and the airbag assembly 64. The liftgate 14 is supported by the vehicle roof 12.

The liftgate 14 is openable at a rear of the vehicle 66 to provide access to the passenger compartment 96, e.g., to a cargo area of the passenger compartment 96. The liftgate 14 is movable between an open position, shown in broken lines in FIG. 4, allowing access to the cargo area and a closed position, shown for example in FIG. 1, inhibiting access to the cargo area and enclosing the passenger compartment 96. The liftgate 14 may pivot between the open position and the closed position. The liftgate 14 may include a window opening 68 and a window 70 disposed in the window opening 68. A hinge 72 may connect the liftgate 14 to the vehicle roof 12, as described further below.

The liftgate 14 includes panels (not numbered), e.g., metal panels, and the hinge 72 is connected to one of the panels. The liftgate 14 may include one or more trim panels (not numbered) supported on the panels of the liftgate 14. The trim panels face the passenger compartment 96 when the liftgate 14 is in the closed position. The trim panels in such an example, the trim panels may include upholstery, padding, etc., including cloth, leather, faux leather, vinyl, plastic, leather, wood, etc.

The liftgate 14 includes a first end 16, a second end 18, a third end 20, and a fourth end 76. The lift gate 14 is supported by the vehicle roof 12 at the first end 16. The liftgate 14 terminates at the first end 16, the second end 18, the third end 20, and the fourth end 76, i.e., the first end 16, second end 18, third end 20, and fourth end 76 define outer boundaries of the liftgate 14. The ends 16, 18, 20, 76 each include a terminal edge at which the liftgate 14 terminates. The first end 16, second end 18, third end 20, and fourth end 76 are adjacent to the vehicle body 28 when the liftgate 14 is in the closed position. Specifically, the vehicle body 28 defines a liftgate opening 78 and the liftgate 14 is pivotable relative to the vehicle body 28 between the closed position and the open position. The vehicle roof 12, body sides 32, and/or a rear bumper 80 may define the liftgate opening 78. In the open position, the first end 16 of the liftgate 14 is adjacent to the vehicle roof 12 and the fourth end 76 is spaced from the vehicle body 28.

Figure 4:
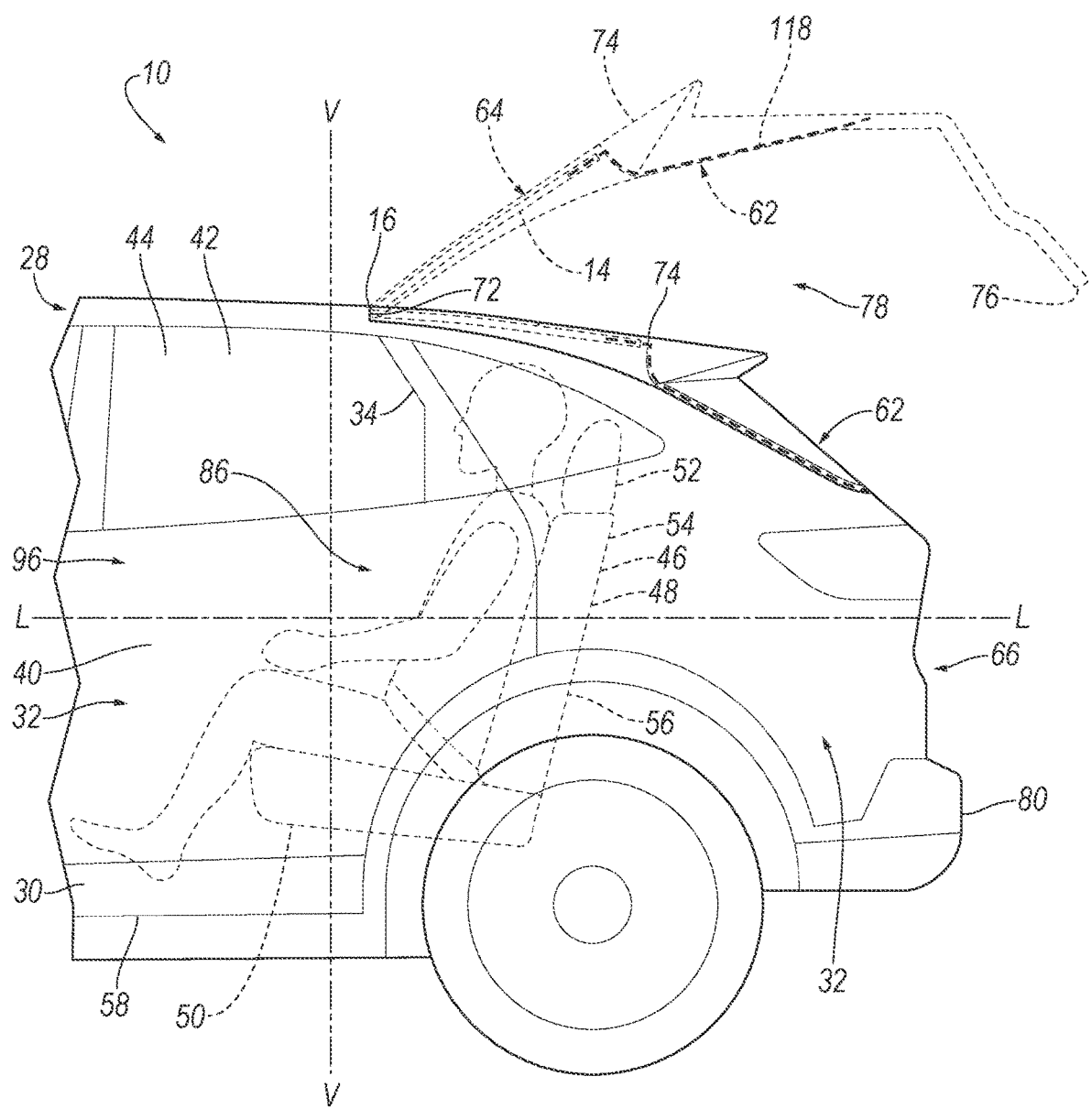
FIG. 4 is a side view of vehicle with the airbag in the uninflated position with the liftgate shown in an open position in broken lines.
Figure 5:
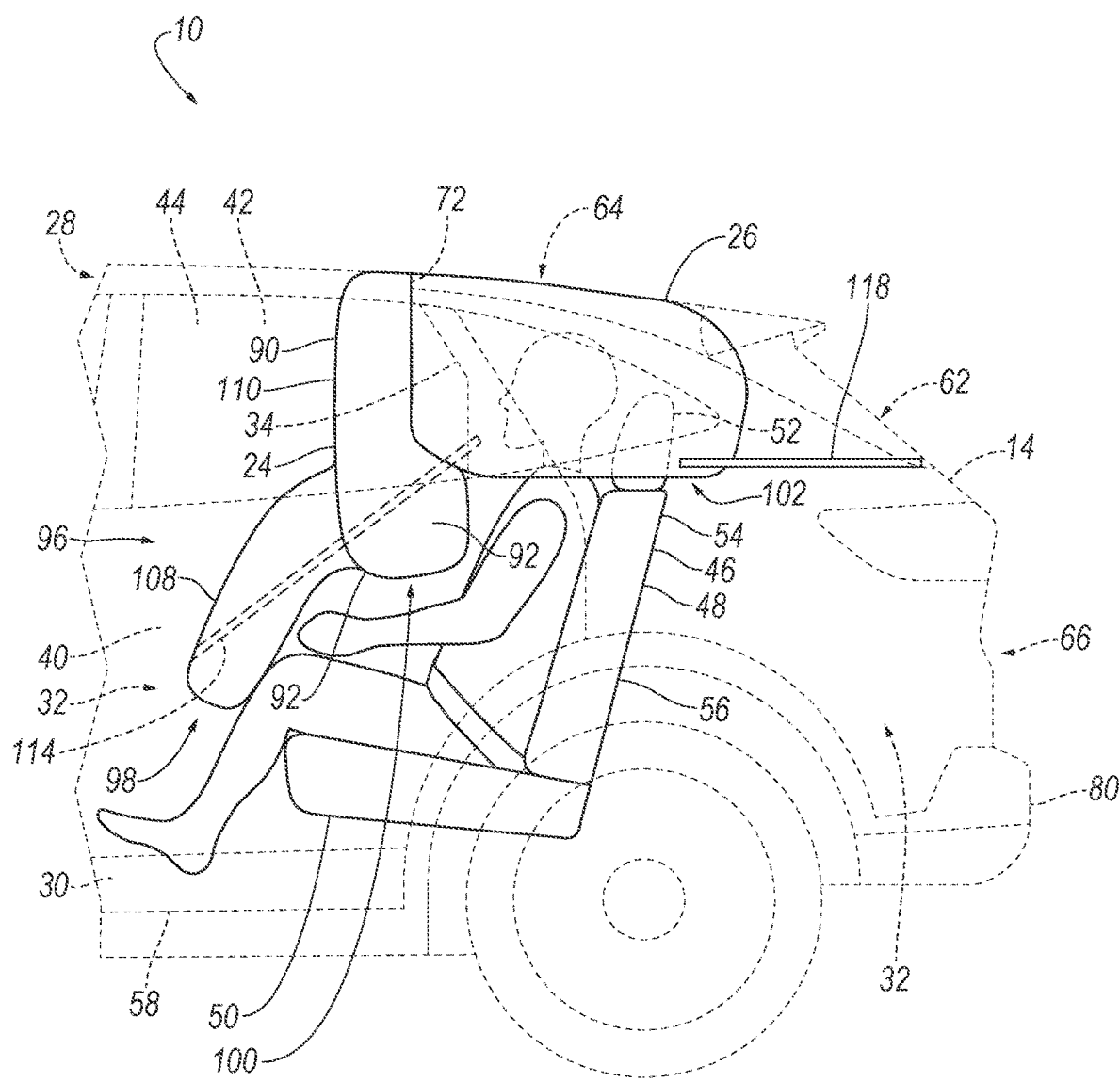
FIG. 5 is a side view of the vehicle with the airbag in the inflated position.

The first end 16 of the liftgate 14 is elongated along the vehicle roof 12. Specifically, the first end 16 of the liftgate 14 is elongated along the cross-vehicle axis C between each body side 32. In the example shown in the Figures, the first end 16 is elongated along and adjacent to the vehicle roof 12. The second end 18 and the third end 20 are spaced from each other cross-vehicle. In the example shown in the Figures, the second end 18 and the third end 20 each extend from the first end 16 away from the vehicle roof 12. Specifically, the second end 18 and the third end 20 may be adjacent to the body sides 32, respectively, when the liftgate 14 is in the closed position. The fourth end 76 is spaced from the first end 16 and the second end 18 and third end 20 extend from the first end 16 to the fourth end 76. The fourth end 76 is below the first end 16 when the liftgate 14 is in the closed position, as shown in FIG. 4-5. The fourth end 76 may be adjacent to the rear bumper 80 when the liftgate 14 is in the closed position.

As set forth above, the liftgate 14 is adjacent to the vehicle roof 12. Specifically, the liftgate 14 is connected to the vehicle roof 12, e.g., pivotably connected. For example, as set forth above, the hinge 72 connects the liftgate 14 to the vehicle roof 12. In the example shown in the Figures, the hinge 72 is between the liftgate 14 and the vehicle roof 12 and pivotably connects the liftgate 14 and the vehicle roof 12. Specifically, the hinge 72 is on the first end 16 of the liftgate 14. Specifically, the hinge 72 pivotably connects the first end 16 of the liftgate 14 to the vehicle roof 12. The liftgate 14 pivots relative to the vehicle roof 12 from the closed position to the open position about the hinge 72. In the example shown in the Figures, the liftgate 14 is directly connected to the vehicle roof 12 by the hinge 72, i.e., the hinge 72 is directly connected to the liftgate 14 and the vehicle roof 12 with no intermediate components therebetween. In other examples, intermediate components may be between the hinge 72 and the liftgate 14 and/or between the hinge 72 and the vehicle roof 12.

The liftgate 14 is above the seat 46 in the closed position. In other words, a vertical line from the seat 46 extends through the liftgate 14 when the liftgate 14 is in the closed position. The liftgate 14 is above the head restraint 52 of the seat 46 in the closed position. As shown in the example in the Figures, the liftgate 14 is above each of the seats 46, and more specifically the head restraint 52 of each of the seats 46, of the rear row of seats.

As set forth above, the liftgate assembly 62 includes at least one airbag assembly 64. The airbag assembly 64 includes at least one inflator 94 that inflates the airbag 22 with inflation medium, as described further below. The airbag assembly 64 is inflatable to surround the occupant on the first end 16 of the liftgate 14, the second end 18 of the liftgate 14, and the third end 20 of the liftgate 14, as described further below.

The airbag 22 may include multiple segments. In such examples, adjacent ones of the segments have at least one non-planar transition therebetween. The non-planar transition defines the boundary between adjacent ones of the segments. As an example, in the example shown in the Figures, the airbag 22 includes a first segment 24, a second segment 26, a third segment 82, and a knee segment 108. In such an example, the seatback 48 is vehicle-rearward the first segment 24 and the knee segment 108 in the inflated position. Specifically, the first segment 24 is elongated along the first end 16 of the liftgate 14, the second segment 26 is elongated along the second end 18 of the liftgate 14, and the third segment 82 is elongated along the third end 20 of the liftgate 14. The first segment 24 is elongated along the cross-vehicle axis C, the second segment 26 is elongated vehicle-rearward from the first segment 24 along the vehicle-longitudinal axis L, and the third segment 82 is elongated vehicle-rearward from the first segment 24 along the vehicle-longitudinal axis L. The knee segment 108 is elongated along the cross-vehicle axis C. The knee segment 108 may be elongated along the first segment 24. The knee segment 108 is supported by the first segment 24 in the inflated position, i.e., the weight of the knee segment 108 is borne by the first segment 24 in the inflated position.

As discussed above, the airbag 22 is supported by the liftgate 14, i.e., the weight of the airbag 22 is borne by the liftgate 14. The airbag 22 moves as a unit with the liftgate 14 as the liftgate 14 moves from the open position to the closed position. In the event of certain vehicle impacts, when the liftgate 14 is in the closed position, the airbag 22 may be inflated from the liftgate 14 to the inflated position. With reference to FIGS. 2-4, the first segment 24 is supported by the first end 16 of the liftgate 14, the second segment 26 is supported by the second end 18 of the liftgate 14, and the third segment 82 is supported by the third end 20 of the liftgate 14. The knee segment 108 is supported by the first end 16 through the first segment 24. In other words, the weight of the first segment 24 is borne by the first end 16 and the weight of the knee segment 108 is borne by the first segment 24, thus the weight of the knee segment 108 is borne by the first end 16 through the first segment 24. The first segment 24, second segment 26, and third segment 82 may be rolled or folded in the uninflated position, e.g., between the liftgate 14 and a trim panel of the liftgate assembly and extends downwardly from the liftgate 14 toward the floor 30 in the inflated position.

The airbag 22 is connected to the liftgate 14, i.e., directly or indirectly through intermediate components. Specifically, the first segment 24, the second segment 26, and/or the third segment 82 are connected to the liftgate 14. The airbag 22, specifically, the first segment 24, the second segment 26, and/or the third segment 82, may be connected to the liftgate 14 in any suitable fashion, e.g., with threaded fasteners, clips brackets etc. In the example shown in the Figures, the first segment 24 of the airbag 22 is directly connected to the first end 16 of the liftgate 14, the second segment 26 of the airbag 22 is directly connected to the second end 18 of the liftgate 14, and the third segment 82 of the airbag 22 is directly connected to the third end 20 of the liftgate 14.

The airbag 22 may extend from the liftgate 14 to a lowermost end 98 of the knee segment 108. The lowermost end 98 of the knee segment 108 is lower than the head restraint 52 in the inflated position. The first segment 24 has a lowermost end 100 and the lowermost end 98 of the knee segment 108, is lower than the lowermost end 100 of the first segment 24. A lowermost end 102 of the second segment 26 and a lowermost end 104 of the third segment 82 may be above the seatback 48 when the second segment 26 and the third segment 82 are in the inflated position and the lowermost end 100 of the first segment 24 may be lower than the head restraint 52 when the first segment 24 is in the inflated position. The lowermost end 100 of the first segment 24 is lower than the lowermost end 102 of the second segment 26 and the lowermost end 104 of the third segment 82 in the inflated position.

The second segment 26 is spaced from the third segment 82 along the cross-vehicle axis C. The second segment 26 and the third segment 82 may each extend from the first end 16 of the liftgate 14 toward the fourth end 76 of the liftgate 14. When the airbag 22 is in the inflated position, the second segment 26 may be adjacent the head restraint 52 and/or the third segment 82 may be adjacent the head restraint 52.

With reference to FIGS. 3 and 5, the second segment 26 may be between the head restraint 52 and the body side 32 in the inflated position and the third segment 82 may be between the head restraint 52 and the other body side 32 in the inflated position. Specifically, the second segment 26 of the airbag 22 may abut the body side 32 and the third segment 82 of the airbag 22 may abut the other body side 32 in the inflated position.

The knee segment 108 is vehicle-forward of the seatback 48 when in the inflated position. Specifically, the knee segment 108 in the inflated position is designed to be vehicle-forward of the occupant-seating area 46. In the inflated position, the lowermost end 98 of the knee portion 108 is vehicle-forward of the knees of an occupant. The knee segment 108 is designed, i.e., sized, shaped, positioned, etc., to contact the knees of an occupant properly seated on the occupant-seating area 46 when the airbag 22 is in the inflated position and during certain vehicle impacts. The lowermost end 98 of the knee portion 108 may be at a higher vertical height than the seat bottom 50, as shown in the example in the Figures, or may be at a lower vertical height than the seat bottom 50.

The first segment 24 of the airbag 22 has a vehicle-forward face 110 in the inflated position. The vehicle-forward face 110 faces vehicle-forward in the inflated position. The vehicle-forward face 110 may be elongated cross-vehicle, as shown in the example in the Figures. The knee segment 108 extends vehicle-forward and downward from the first segment 24. Specifically, the knee segment 108 protrudes vehicle-forward from the first segment 24 at the vehicle-forward face 110. The knee segment 108 is vehicle-forward of the lowermost end 100 of the first segment 24 and may extend vehicle-downward from the lowermost end 100 of the first segment 24. As set forth above, the lowermost end 98 of the knee segment 108 is lower than the lowermost end 100 of the first segment 24.

Figure 6:
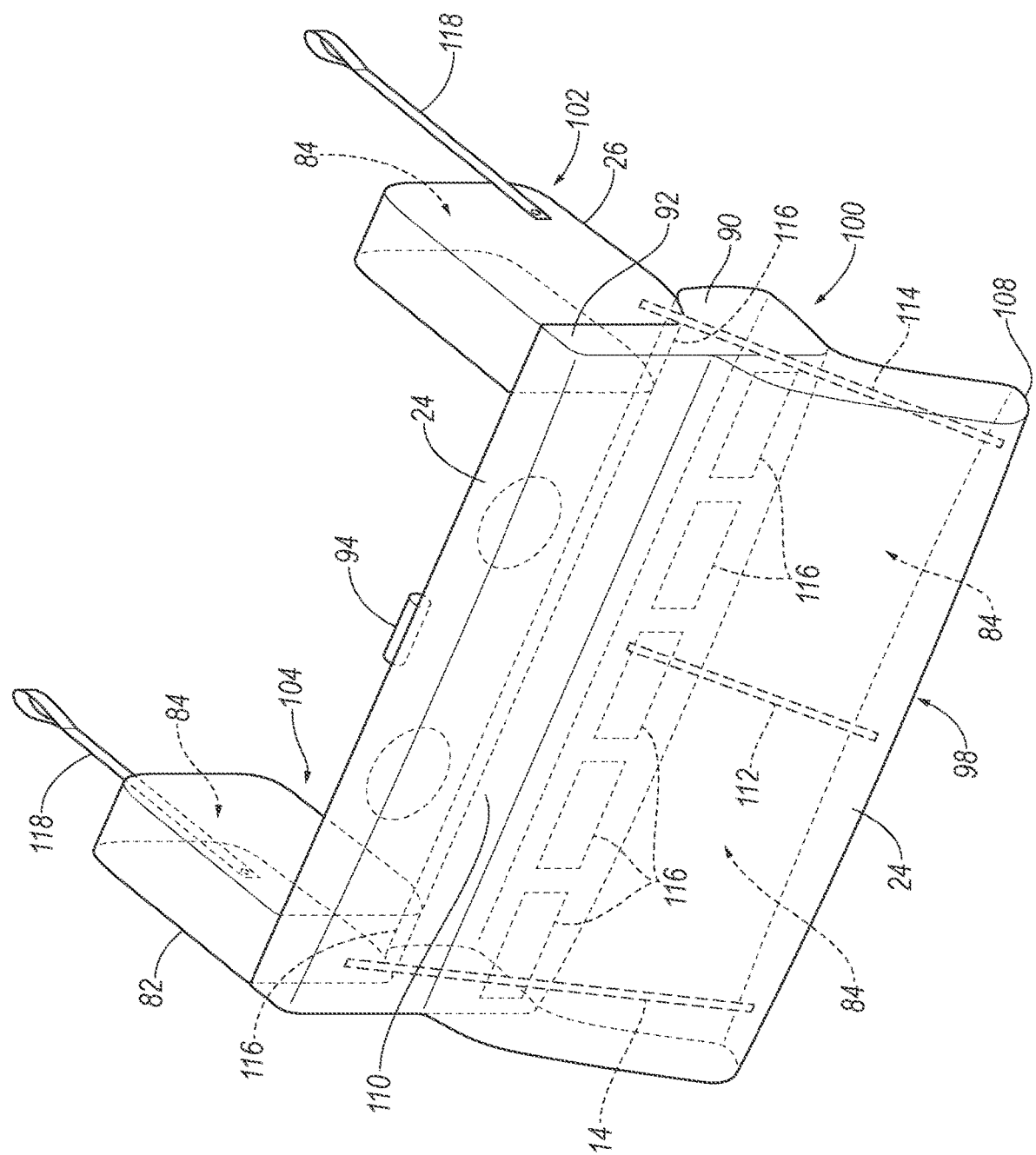
FIG. 6 is a perspective view of the airbag.

With reference to FIGS. 5 and 6, the airbag 22 includes at least one internal tether 112, 114 connected to the knee segment 108 to aid in the guiding of positioning of the knee segment relative to the rest of the airbag 22, e.g., the first segment 24, the second segment 26, and/or the third segment 82. The internal tethers 112, 114 are internal to the airbag 22, i.e., are in the inflation chambers 84. The internal tethers 112, 114 may be of any suitable material. As an example, the internal tethers 112, 114 may be fabric and, in such examples, may be of the same type of material as the rest of the airbag 22.

With continued reference to FIGS. 5 and 6, the airbag 22 includes at least one internal tether 112 extending from the first segment 24 to the knee segment 108. The internal tether 112 may be connected directly to a vehicle-rearward panel of the first segment 24 and a vehicle-forward panel of the knee segment 108, e.g., by stitching, adhesive, ultrasonic welding, etc. The internal tether 112 extends through the inflation chamber 84 of the first segment 24 and the inflation chamber 84 of the knee segment 108. The internal tether 112 may extend from the first segment 24 to the knee segment 108 through an opening 116 between the first segment 24 and the knee segment 108, as shown in in the example in FIGS. 5 and 6. In the example shown in the Figures, the airbag 22 includes one internal tether 112 extending from the first segment 24 to the knee segment 108 and in other examples the airbag 22 may include any suitable number of internal tethers 112.

With continued reference to FIGS. 5 and 6, the airbag may include at least one an internal tether 114 extending from the second segment 26 through the first segment 24 to the knee segment 108 and/or at least one internal tether 114 extending from the third segment 82 through the first segment 24 to the knee segment 108.

The internal tether 114 may be connected directly to a vehicle-rearward panel of the second segment 26/third segment 82 and a vehicle-forward panel of the knee segment 108, e.g., by stitching, adhesive, ultrasonic welding, etc. In the example shown in the Figures, one of the internal tethers 114 extends through the inflation chamber 84 of the second segment 26, the inflation chamber 84 of the first segment 24, and the inflation chamber 84 of the knee segment 108, i.e., extends through the inflation chamber 84 of the first segment 24 from the second segment 26 to the knee segment 108. In the example shown in the Figures, one of the internal tethers 114 extends through the inflation chamber 84 of the third segment 82, the inflation chamber 84 of the first segment 24, and the inflation chamber 84 of the knee segment 108, i.e., extends through the inflation chamber 84 of the first segment 24 from the third segment 82 to the knee segment 108. The internal tether 112 may extend from the second segment 26/third segment 82 to the first segment 24 through an opening 116 between the second segment 26/third segment 82 and may extend from the first segment 24 to the knee segment 108 through an opening 116 between the first segment 24 and the knee segment 108, as shown in in the example in FIGS. 5 and 6.

In the example shown in the Figures, the airbag 22 includes one internal tether 114 extending from the second segment 26 to the knee segment 108 and one internal tether 114 extending from the third segment 82 to the knee segment 108 and in other examples the airbag 22 may include any suitable number of internal tethers 114 extending from the second segment 26 and/or the third segment 82 to the knee segment 108.

The second segment 26, the third segment 82, and the knee segment 108 may be inflated through the first segment 24. In other words, the inflator 94 may inflate the first segment 24 to the inflated position with inflation medium and the inflation medium flows through the first segment 24 to the second segment 26, the third segment 82, and the knee segment 108 to the inflated position. Specifically, the second segment 26, the third segment 82, and the knee segment 108 may share an inflation chamber 84 with the first segment 24. For example, the first segment 24 may have an inflation chamber 84 and the second segment 26, the third segment 82, and the knee segment 108 each may have an inflation chamber 84 open to the inflation chamber 84 of the first segment 24, e.g., through openings 116.

In the inflated position, the first segment 24 may include an upper portion 90 and a lower portion 92. The upper portion 90 and the lower portion 92 may share the inflation chamber 84. In the inflated position, the lower portion 92 is thicker than the upper portion 90 in a direction along the longitudinal axis L of the vehicle 10. In the inflated position, the second segment 26 and the third segment 82 extend vehicle-rearward from the upper portion 90 above the lower portion 92. In the inflated position, the first segment 24 of the airbag 22 may include detents configured to receive a head of an occupant during certain vehicle impacts. In the example shown in the Figures, the knee segment 108 is connected to and extends from the lower portion 92.

The elongation of the first segment 24 of the airbag 22 along the first end 16 of the liftgate 14 and elongation of the second segment 26 of the airbag 22 along the second end 18 of the liftgate 14 allows the first segment 24 and the second segment 26 to inflate along the first end 16 and the second end 18 of the liftgate 14 to control the kinematics of the occupant during certain vehicle impacts. The support of the airbag 22 on the liftgate 14 allows for inflation along the first end 16 and the second end 18 of the liftgate 14 can accommodate for packaging constraints in other areas of the vehicle 10, e.g., the vehicle roof 12, a rear pillar 34, etc.

The airbag 22 may include a tether 118 fixed to the airbag 22 and the liftgate 14. In other words, the tether 118 anchors the tether 118 to the liftgate 14. The tether 118 aids in the positioning of the airbag 22 to the liftgate 14 and the vehicle body 28. The tether 118 is at least in part external to the inflation chambers 84 of the airbag 22. In the example shown in the Figures, the tether 118 is entirely external to the inflation chambers 84 of the airbag 22.

The tether 118 extends from the airbag 22 vehicle-rearward to the liftgate 114. In other words, the direction of the extension of the tether 118 from the airbag 22 to the liftgate 114 has a vehicle-rearward component. The tether 118 may be elongated along a direction that has a vehicle-rearward component. The tether 118 may be elongated horizontally or non-horizontal. In the uninflated and/or inflated positions, the seat 46 of the rear row is between the tethers 118, i.e., a straight line from one tether 118 to the other tether 118 extends through the seat 46.

In the example shown in the Figures, the airbag 22 includes two tethers 118, namely one tether 118 fixed to the second segment 26 and the liftgate 14 and another tether 118 fixed to the third segment 82 and the liftgate 14. The tethers 118 are spaced cross-vehicle from each other and extend from the second segment 26 and third segment 82, respectively, vehicle-rearward to the liftgate 14. Specifically, the tethers 118 extend from the second segment 26 and the third segment 82, respectively, toward the fourth end 76 of the liftgate 14. The tethers 118, for example, may be connected to the second end 18 and the third end 20 of the liftgate 14 between the first end 16 and the fourth end 76. In other examples, the tethers 118 may be connected to the fourth end 76.

The tether 118 is fixed to the airbag 22 vehicle-rearward of the seat 22. In other words, the tethers 118 may be fixed to the second segment 26 and the third segment 82 at a point that is behind the rearward-most part of the seat 22 along a line parallel to the longitudinal axis L of the vehicle. The tether 118 may be connected directly to the second segment 26/third segment 82 by, for example, stitching, adhesive, ultrasonic welding, etc. The tethers 118 may be connected to the liftgate 14 by, for example, a loop on the tether 118 engaged with the liftgate, e.g., by bracket, threaded fastener, etc.

As set forth above, the airbag assembly 64 includes the inflator 94. The inflator 94 is in fluid communication with the airbag 22. The inflator 94 expands the airbag 22 with inflation medium, such as a gas, to move the airbag 22 from the uninflated position to the inflated position.

The inflator 94 may be supported by the liftgate 14, i.e., the weight of the inflator 94 is borne by the liftgate 14. In such examples, the inflator 94 may be directly connected to the liftgate 14 or indirectly connected to the liftgate 14. For example, in examples including a housing (not numbered), the inflator 94 may be supported by the housing and the housing may be supported by the liftgate 14. In other examples, the inflator 94 may be supported by the vehicle roof 12, the pillar 34 of the vehicle 10, etc. The inflator 94 may be, for example, a pyrotechnic inflator 94 that ignites a chemical reaction to generate the inflation medium, a stored gas inflator 94 that releases (e.g., by a pyrotechnic valve) stored gas as the inflation medium, or a hybrid. The inflator 94 may be, for example, at least partially in the inflation chamber 84, 86, 88 to deliver inflation medium directly to the inflation chamber 84, 86, 88 or may be connected to the inflation chamber 84, 86, 88 through fill tubes, diffusers, etc.

The first segment 24, the second segment 26, and the third segment 82 may be fabric, e.g., a woven polymer. For example, the fabric may be woven nylon yarn, for example, nylon. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle roof;
   a liftgate pivotable relative to the vehicle roof between an open position and a closed position;
   an airbag supported by the liftgate and moveable with the liftgate between the open position and the closed position;
   a tether fixed to the airbag and the liftgate, the tether extending from the airbag vehicle-rearward to the liftgate;
   the airbag having a first segment elongated cross-vehicle and a second segment extending vehicle-rearward from the first segment, the tether being fixed to the second segment; and
   the airbag including a third segment spaced cross-vehicle from the second segment and extending vehicle-rearward from the first segment; and
   a second tether fixed to the third segment and the liftgate, the second tether extending from the airbag vehicle-rearward to the liftgate.

2. The vehicle of claim 1, further comprising a seat including a seatback, the airbag in an inflated position being vehicle-forward of the seatback.

3. The vehicle of claim 2, wherein the tether is fixed to the airbag vehicle-rearward of the seat.

4. The vehicle of claim 2, wherein the liftgate is above the seat.

5. The vehicle as set forth in claim 1, further comprising a seat including a seatback, the seatback being vehicle-rearward of the first segment in an inflated position.

6. The vehicle of claim 5, wherein the second segment is above the seatback when the second segment is in the inflated position.

7. The vehicle of claim 1, further comprising a seat, the seat being between the tether and the second tether when the airbag is in an inflated position.

8. The vehicle of claim 1, wherein the first segment has an inflation chamber, the second segment has an inflation chamber open to the inflation chamber of the first segment, the third segment has an inflation chamber open to the inflation chamber of the first segment, and the knee segment has an inflation chamber open to the inflation chamber of the first segment.

9. The vehicle of claim 1, further comprising a seat including a head restraint, the second segment is adjacent the head restraint in the inflated position.

10. The vehicle of claim 1, wherein the second tether is spaced cross-vehicle from the tether.

11. The vehicle of claim 1, wherein the tether is external to the airbag.

12. The vehicle of claim 1, further comprising an inflator supported by the liftgate.

13. A vehicle comprising:
    a vehicle roof;
    a liftgate pivotable relative to the vehicle roof between an open position and a closed position;
    an airbag supported by the liftgate and moveable with the liftgate between the open position and the closed position; and
    a tether fixed to the airbag and the liftgate, the tether extending from the airbag vehicle-rearward to the liftgate;
    the airbag includes a first segment supported by the liftgate and a knee segment supported by and extending downwardly from the first segment in an inflated position.

14. The vehicle of claim 13, wherein the first segment has a vehicle-forward face in the inflated position and the knee segment extends vehicle-forward and downward from the first segment.

15. The vehicle of claim 13, wherein the airbag includes an internal tether extending from the first segment to the knee segment.

16. The vehicle of claim 13, wherein the airbag has a second segment extending vehicle-rearward from the first segment and an internal tether extending from the second segment through the first segment to the knee segment.

17. A liftgate assembly comprising:
    a liftgate having a first end, a second end, a third end, and a fourth end;
    the first end being spaced from the fourth end and the second end and third end each extending from the first end to the fourth end;
    a hinge on the first end of the liftgate;
    an airbag supported by the liftgate and moveable with the liftgate; and
    a tether fixed to the airbag and the liftgate, the tether extending from the airbag toward the fourth end of the liftgate;
    the airbag including a first segment supported by the liftgate and a knee segment supported by and extending downwardly from the first segment in an inflated position.

18. The liftgate assembly as set forth in claim 17, wherein the first segment is elongated along the first end of the liftgate and the airbag includes a second segment extending from the first segment toward the third end of the liftgate, the tether being fixed to the second segment of the airbag and extending from the second segment toward the third end of the liftgate.

* * * * *